(12) United States Patent
Delucia

(10) Patent No.: US 11,457,565 B1
(45) Date of Patent: Oct. 4, 2022

(54) DEVICE FOR TRANSPORTING AND STORING A GRASS CATCHER ON A COMMERCIAL LAWN MOWER

(71) Applicant: Vincent M. Delucia, Bohemia, NY (US)

(72) Inventor: Vincent M. Delucia, Bohemia, NY (US)

( * ) Notice: Subject to any disclaimer, the term of this patent is extended or adjusted under 35 U.S.C. 154(b) by 368 days.

(21) Appl. No.: 16/853,935

(22) Filed: Apr. 21, 2020

Related U.S. Application Data

(60) Provisional application No. 62/837,473, filed on Apr. 23, 2019.

(51) Int. Cl.
*A01D 43/063* (2006.01)
*A01D 101/00* (2006.01)

(52) U.S. Cl.
CPC ........ *A01D 43/063* (2013.01); *A01D 2101/00* (2013.01)

(58) Field of Classification Search
CPC ... A01D 2101/00; A01D 43/00; A01D 43/063
See application file for complete search history.

(56) References Cited

U.S. PATENT DOCUMENTS

| | | | | |
|---|---|---|---|---|
| 2,990,666 A * | 7/1961 | Blume | ................. | A01D 43/063 55/319 |
| 6,012,273 A * | 1/2000 | Ogasawara | ........ | A01D 43/0635 56/16.6 |
| 6,082,086 A * | 7/2000 | Togoshi | ................. | A01D 34/44 56/7 |
| 7,240,472 B2 * | 7/2007 | Evers | ................... | A01D 43/063 56/202 |
| 2002/0083694 A1 * | 7/2002 | Nagai | ................ | A01D 43/0635 56/16.8 |
| 2003/0182914 A1 * | 10/2003 | Shibata | ................... | A01D 34/71 56/202 |
| 2005/0005587 A1 * | 1/2005 | Suhara | ................. | A01D 43/063 56/14.7 |
| 2005/0016148 A1 * | 1/2005 | Caroni | ............... | A01D 43/0635 56/204 |
| 2009/0126328 A1 * | 5/2009 | Shimizu | ............... | A01D 43/063 56/16.6 |

* cited by examiner

*Primary Examiner* — Brian L Swenson
(74) *Attorney, Agent, or Firm* — Betsy Kingsbury Dowd; BKDowd Law, P.C.

(57) ABSTRACT

A device for transporting and storing a grass catcher on a commercial lawn mower, includes a mounting unit that includes a top plate for mounting to a top planar surface on the front portion of the commercial lawn mower; a support strut extending upward from the mounting unit; and a horizontal arm extending perpendicularly from a top end of the support strut. The horizontal arm includes a first retaining element and a second retaining element separated a distance therefrom, the first retaining element configured for retaining the first mounting element of the grass catcher and the second retaining element configured for retaining the second mounting element of the grass catcher for transport. The device positions the grass catcher on the front of, within a width of, and sufficiently raised above the cutting deck of the lawn mower for safe transport.

20 Claims, 7 Drawing Sheets

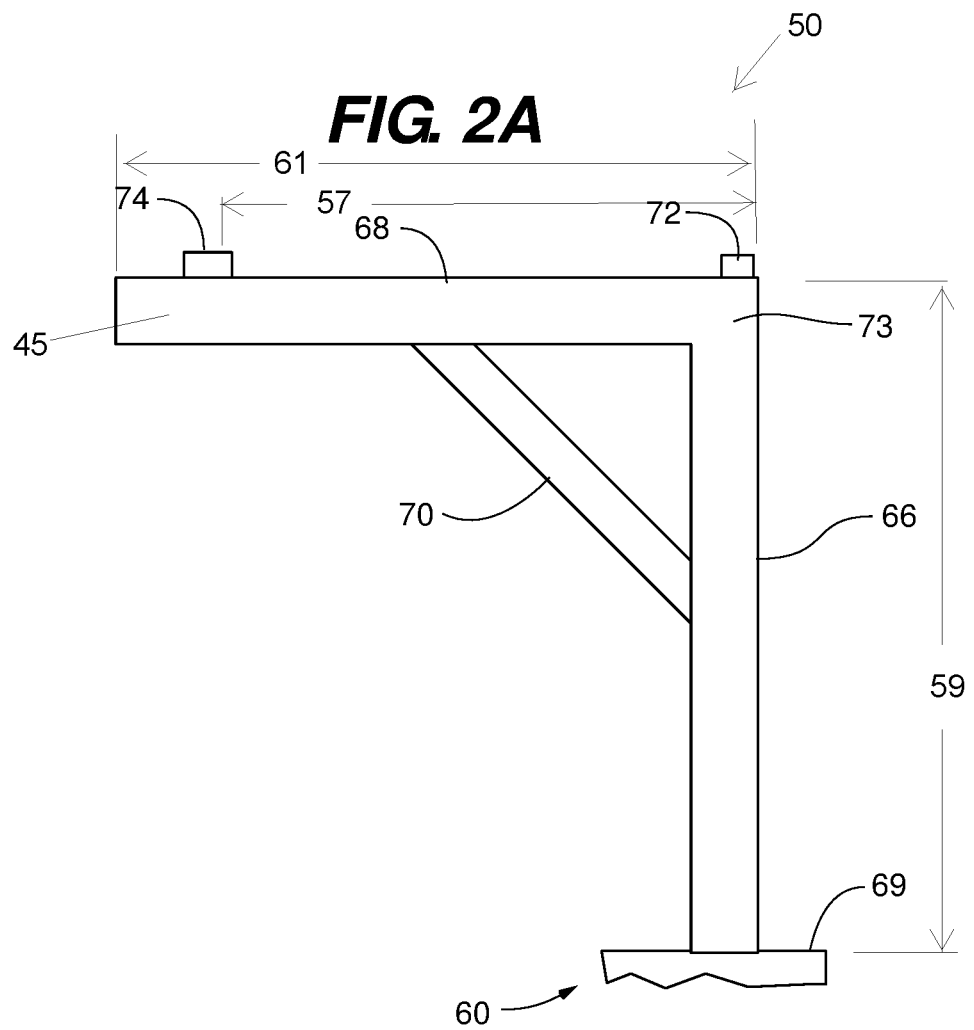

DEVICE FOR TRANSPORTING AND STORING A GRASS CATCHER ON A COMMERCIAL LAWN MOWER

CROSS-REFERENCE TO RELATED APPLICATIONS

This application claims the benefit of and priority to U.S. Provisional Application Ser. No. 62/837,473 entitled "DEVICE FOR TRANSPORTING AND STORING A GRASS CATCHER ON A COMMERCIAL LAWN MOWER," filed Apr. 23, 2019, the entirety of which is hereby incorporated herein by reference thereto.

FIELD OF DISCLOSURE

The present disclosure relates generally to accessories for commercial lawn mowers, and, in particular, to a device for transporting a rigid grass catcher on a commercial lawn mower.

BACKGROUND

Grass catchers have become popular additions to commercial lawn mowers, particularly for use by professional landscapers. Although bag grass catchers are sometimes used, these have limited value for high-volume use, and are not the subject of the present invention. Rigid, frame-type grass catchers formed of metal or plastic have a high volume capacity, are very sturdy, and are preferred by many commercial landscapers. Various rigid grass catchers have been developed for mounting at the discharge port of particular lawn mowers for collecting grass clippings while mowing.

It can be appreciated that, particularly for side discharge lawn mowers, it would be impractical to permanently mount a rigid grass catcher to the lawn mower. The added width and weight added to the lawn mower with the grass catcher installed makes it very difficult to maneuver during transport from one location to another, and to store. To allow easy mounting of the grass catcher for use on the lawn mower, and easy removal for transporting and storage, the grass catchers are generally provided with mounting hardware that mounts to the lawn mower and that includes attaching elements onto which the grass catcher can be mounted and removed, as needed. It will be appreciated that the grass catcher will also include complementary attaching elements configured to mount to the attaching elements on the mounting hardware.

Although the grass catchers can be removed from the lawn mower for transport on the small flatbeds, e.g., often used by landscapers, to different work sites, these rigid grass catchers are very heavy, and can cause damage to other equipment on the flatbed. A heavy grass catcher poorly placed on top of the lawn mower can cause expensive damage to cutter deck and motor components of the lawn mower.

Accordingly, there is a need for a device for transporting a rigid grass catcher together with a commercial lawn mower, especially commercial lawn mowers with side discharge ports.

SUMMARY

Features of the disclosure will become apparent from the following detailed description considered in conjunction with the accompanying drawings. It is to be understood, however, that the drawings are designed as an illustration only and not as a definition of the limits of this disclosure.

The present disclosure is directed to a device for transporting a grass catcher together with a lawn mower, which includes elements for mounting the grass catcher to a front of the lawn mower in such a way that the grass catcher does not contact any portion of the lawn mower, and does not extend beyond a width of the lawn mower when mounted thereon for transport or storage.

The present disclosure is also directed to a combination of a grass catcher and the device for transporting and storing the grass catcher thereon. The disclosure is also directed to a lawnmower having the device installed thereon.

The present disclosure is also directed to a device for transporting a grass catcher on a commercial lawn mower, the grass catcher having a first mounting element positioned along its outer edge and a second mounting element positioned apart therefrom for aligning and mounting the grass catcher onto a side discharge port of the commercial lawn mower in use. The device includes a mounting unit including a top plate for mounting to a top planar surface on the front portion of the commercial lawn mower; a support strut extending upward from the mounting unit; and a horizontal arm extending perpendicularly from a top end of the support strut. The horizontal arm includes a first retaining element and a second retaining element separated a distance therefrom. The first retaining element is configured for retaining the first mounting element of the grass catcher and the second retaining element is configured for retaining the second mounting element of the grass catcher for transport.

In aspects, the first retaining element is one of a nut, eye bolt, and ring-shaped element including an aperture, wherein the aperture is aligned perpendicular to the horizontal arm and facing the second retaining element, and wherein the first retaining element is configured for retaining the first mounting element of the grass catcher within the aperture.

The second retaining element may include, in aspects, two plates extending integrally upward from the horizontal arm, a first one of the two plates extending away from a second one of the two plates in a direction along the horizontal arm toward the first retaining element, the second one of the two plates extending perpendicularly from the first one, being positioned parallel to and facing the aperture of the first retaining element.

In further aspects, the first one of the two plates may extend along an edge of a front side surface of the horizontal arm, the front side surface configured to face the grass catcher mounted thereto for transport.

The device may further include an angled support strut connected at a 45 degree angle to each of the support strut and the horizontal arm.

In aspects, the horizontal arm of the device in use on the lawn mower is oriented with respect to the mounting unit to align the horizontal arm with a width of the lawn mower.

The first retaining element and the second retaining element, in aspects, are positioned along the horizontal arm such that a width of the grass catcher mounted against the front side surface in use does not extend beyond the width of the lawn mower.

In embodiments, the distance between the first retaining element and the second element may be between about 9 inches and about 18 inches, and a height of the support strut from the top plate of the mounting unit may be between about 4 inches and about 12 inches high.

The support strut is positioned, in aspects, at an angle of between about 10 to about 20 degrees relative to a perpendicular axis to the top plate of the mounting unit, the support strut being angled in a direction toward a front side surface of the horizontal arm.

In embodiments, the mounting unit includes a pair of parallel plates including the top plate, and bolts extending through the pair of parallel plates, for mounting to a bar in the front portion of the lawn mower.

The mounting unit may include, in aspects, a right angle bracket, the right angle bracket including the top plate for mounting to the top planar surface and a vertical plate extending integrally therefrom for mounting to a side planar surface of the lawn mower.

The vertical plate, in aspects, is aligned at an angle of between about 10 and about 20 degrees to the front side surface of the horizontal arm.

The horizontal arm may include, in aspects, a first portion extending in one direction and a second portion extending in an opposite direction from the support strut.

The second portion, in aspects, may be between two to three times longer that the first portion of the horizontal arm. The device may further include, in embodiments, an angled support strut connected at a 45 degree angle to each of the support strut and the second portion of the horizontal arm.

The present disclosure is also directed to the combination of any of the embodiments and aspects of the device for transporting and storing the grass catcher when not in use, the grass catcher having a facing side for mounting to, and extending beyond, a side discharge port of a commercial lawn mower in use, a first mounting element positioned along its outer edge and a second mounting element positioned apart therefrom for aligning and mounting the grass catcher onto the side discharge port of the commercial lawn mower in use.

In addition to the above embodiments and aspects of the present disclosure, additional aspects, objects, features and advantages will be apparent from the embodiments presented in the following description and in connection with the accompanying drawings.

BRIEF DESCRIPTION OF THE DRAWINGS

The drawings constitute a part of this disclosure and include examples, which may be implemented in various forms. It is to be understood that in some instances, various aspects of the disclosure may be shown exaggerated or enlarged to facilitate understanding. The teaching of the disclosure can be readily understood by considering the detailed description in conjunction with the accompanying drawings, which are briefly described below.

FIG. 2A is a pictorial representation of embodiments of a device of the present disclosure.

Figure 1A:
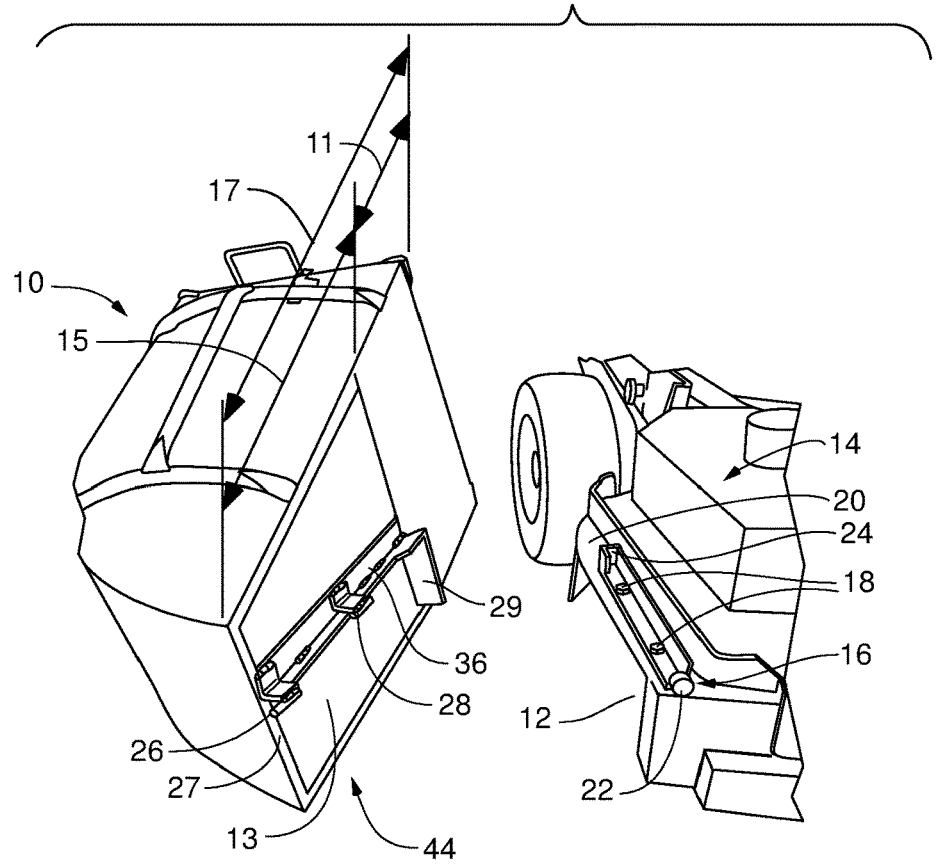
FIGS. 1A and 1B are pictorial representations of prior art lawn mowers and grass catchers.

The various aspects of the present disclosure mentioned above are described in further detail with reference to the aforementioned figures and the following detailed description of exemplary embodiments.

DETAILED DESCRIPTION

Particular illustrative embodiments of the present invention are described hereinbelow with reference to the accompanying drawings; however, the disclosed embodiments are merely examples, which may be embodied in various forms. It should be apparent to those skilled in the art that the described embodiments provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present disclosure of a device of the present disclosure for transporting and storing a rigid grass catcher on a commercial lawn mower as defined herein and equivalents thereto. Well-known functions or constructions and repetitive matter are not described in detail to avoid obscuring the present disclosure in unnecessary or redundant detail. Therefore, specific structural and functional details disclosed herein are not to be interpreted as limiting. In this description, as well as in the drawings, like-referenced numbers represent elements which may perform the same, similar, or equivalent functions.

Throughout the description, where items are described as having, including, or comprising one or more specific components or features, or where methods are described as having, including, or comprising one or more specific steps, it is contemplated that, additionally, there are items of the present disclosure that consist essentially of, or consist of, the one or more recited components or features, and that there are methods according to the present disclosure that consist essentially of, or consist of, the one or more recited processing steps.

An example of a commercial grass catcher 10 is shown in FIG. 1A, before mounting to discharge port 12 of a commercial lawn mower 14. The grass catcher 10 includes an intake port 13 configured and shaped to align and fit onto the discharge port 12. The discharge port 12 of the particular lawn mower 14 shown is located on one side of the lawn mower. For mounting the grass catcher 10, an accessory bracket 16 may be permanently fixed to the lawn mower 14 with bolts 18 and nuts (not visible), for example. The upper plate 20 over the discharge port 12 may also need to be modified with through holes (not visible) for mounting the accessory bracket 16 via nuts and bolts 18.

Figure 1B:
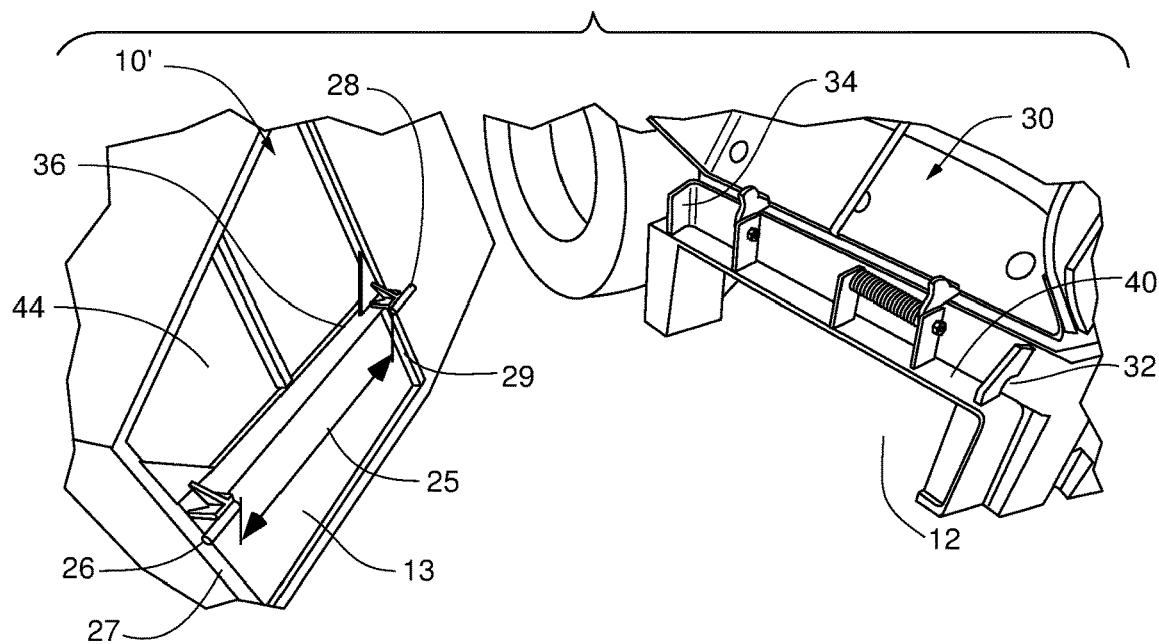
Figure 1C:
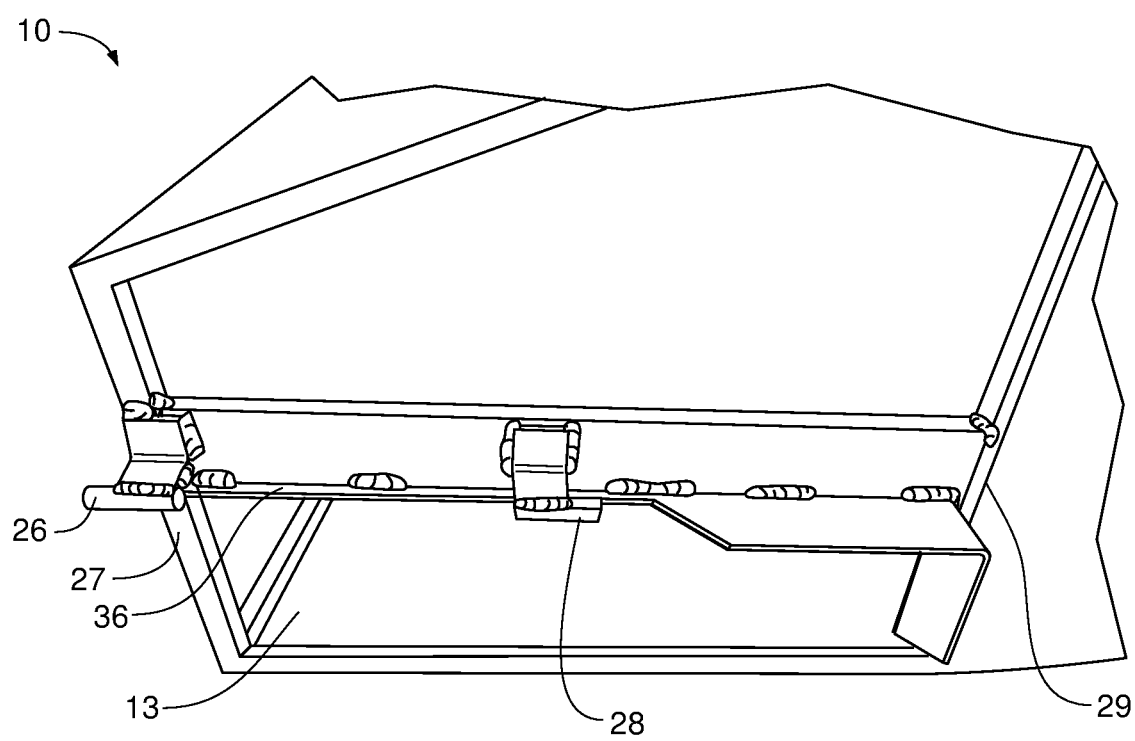
FIG. 1C is a close-up view of the grass catcher of FIG. 1A.

The accessory bracket 16 includes a first 22 and a second attachment element 24 for mounting a first mounting element 26 and a second mounting element 28 located on the grass catcher 10 thereto for normal use. With reference to FIGS. 1A-1C, it is noted that, as referred to herein, the first mounting element 26 on the grass catcher is positioned along an outside edge 27 of both the intake port 13 and the grass catcher 10, and the second mounting element 28 on the grass catcher is positioned along an upper edge 36 and inward from both the outside edge 27 of the grass catcher 10 and an inner edge 29 of the intake port 13, i.e., above the intake port 13, as shown in FIGS. 1A and 1C, or, in embodiments, above the inner edge 29 that adjoins the intake port 13 to an added width 11 of the grass catcher 10' as shown in FIG. 1B, as described further herein.

The attachment elements 22, 24 on the lawn mower 14 or bracket 16 attached thereto may, for example, include attachment element 22 having an aperture, such as a nut, eye bolt, or other ring-shaped element, or a plate with an aperture, permanently secured to the bracket, through which the first mounting element 26 on the grass catcher 10 may be positioned. In embodiments, the first mounting element 26 on the grass catcher is a pin, cylindrical protrusion, or similar protruding element or tab extending in an outward direction from the intake port 13.

The second attachment element 24 on the lawn mower 14 or bracket 16 may be a small right angle bracket or clip. Referring to FIGS. 1A, 1C, for example, the second mounting element 28 on the grass catcher 10 for mounting to the second attachment element 24 may be any outwardly protruding, preferably rigid structure with a flat end, of any suitable shape. In embodiments, the second mounting element 28 is a protruding rectangular-shaped element, e.g., a rectangular prism, or a flat plate, for mounting to the second attachment element 24. The second mounting element 28 abuts a portion of the second attachment element 24, and the first mounting element 26 is captured in the aperture in the first attachment element 22, when the grass catcher 10, for example, is mounted over the discharge port 12 via the accessory bracket 16 for use.

In the example shown in FIG. 1B, a commercial lawn mower 30 may have a first 32 and a second attachment element 34 built onto the upper plate 40 over the discharge port 12 of the lawn mower 30, so that an accessory bracket is not required for attaching the grass catcher 10'. In this embodiment, the first attachment element 32 on the lawn mower 30 is a plate with an aperture for receiving the first mounting element 26, and the second attachment element 34 on the lawn mower 30 is a right angle plate extending integrally upward from the upper plate 40. The second mounting element 28 on the grass catcher 10' shown in FIG. 1B abuts one of the plates forming the second attachment element 34, and the first mounting element 26 is captured in the aperture of the first attachment element 32 when the grass catcher 10' is mounted over the discharge port 12 of the lawn mower 30.

In embodiments of the grass catcher of the present disclosure, referring for example to FIG. 1B, the first mounting element 26 and the second mounting element 28 are positioned a distance 25 apart that corresponds to the distance between the first attachment element 32 and the second attachment element 34 on the lawn mower 30 (or between the first attachment element 22 and the second attachment element 24 on the accessory bracket 16 shown in FIG. 1A).

As can be seen in FIGS. 1A and 1B, a side 44 of the grass catcher itself extends well beyond a width 15 of the intake port 13 when mounted, the grass catcher being sized to provide a large inner volume for collecting grass clippings. Referring to the grass catcher 10 shown in FIG. 1A, for example, the inner volume can be quite large. This is achieved in part by the added width 11 of the grass catcher 10 that extends beyond the width 15 of the intake port 13, the added width 11 extending toward a rear of the lawn mower 14 when installed for use.

While a width of a commercial lawn mower is sized to fit through a standard gated entranceway to a property, so that the width is typically less than 34 inches wide, the footprint of a lawn mower with a side discharge port for driving through an entranceway is substantially increased when the grass catcher is attached. Accordingly, the grass catcher typically is carried separately from the lawn mower and not attached until after a landscaper has cleared the entranceway of the property.

To avoid this problem, and to also provide a convenient way to both store and transport a grass catcher on and off of the landscaper's flatbed and through entranceways, the present disclosure provides a device for storing and transporting the grass catcher on a lawn mower. Referring again to FIG. 1A, e.g., a total width 17 of the side 44 of the grass catcher 10 that mounts onto the lawn mower 14, that is, the width 15 of the intake port 13 plus the added width 11, is typically also less than 34 inches, so that it fits within the width of the lawn mower 14 that needs to fit through an entranceway. The present disclosure provides a device that allows a commercial grass catcher, such as, but not limited to, those shown in FIGS. 1A and 1B, to be mounted on a front portion 67 of the lawn mower 14 (see FIG. 2C, for example), with the side 44 of the grass catcher 10 facing toward the rear of the lawn mower, the side 44 of the grass catcher 10 being positioned adjacent to, and in embodiments, resting against a front side surface 45 (FIGS. 2A-2D, e.g.) of the horizontal arm 68 of the device 50 as described below. Accordingly, as shown in FIG. 2C, the width of the lawn mower 14 with the grass catcher 10 mounted thereto for transport via embodiments of the device 50 of the present disclosure does not exceed the width of the lawn mower 14 by itself.

Examples of commercial lawn mowers suitable for mounting the device of the present disclosure thereto include side-discharge SCAG® mowers made by SCAG POWER EQUIPMENT, INC., 1000 Metalcraft Drive, Mayville, Wis. 53050, and those sold by Wright Manufacturing Inc., 4600X Wedgewood Boulevard, Frederick, Md. 21703, including those sold with its rigid metal Grass Gobbler™ grass catchers.

Figure 2B:
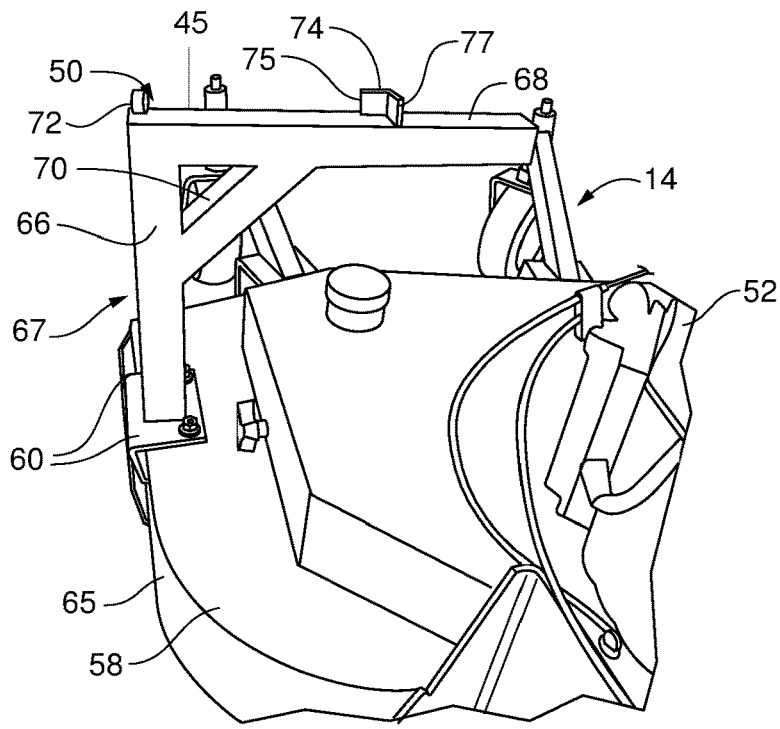
FIG. 2B is a pictorial representation of a particular embodiment of the device mounted to a commercial lawn mower.

As described further herein, referring to FIG. 2A, embodiments of a device of the present disclosure include: a mounting unit 60 for mounting the device to a commercial lawn mower; a support strut 66 extending upward from the mounting unit 60; a horizontal arm 68 attached horizontally to the support strut 66 and configured to extend over at least a portion of the width 79 of the lawn mower (see FIG. 2B, 2C, e.g.); and a first retaining element 72 and a second retaining element 74 permanently secured, for example, by welding, to the horizontal arm 68, for mounting a commercial grass catcher thereto for storage and transport. Embodiments may also include an angled support strut 70 connected at an approximate 45-degree angle between the support strut 66 and the horizontal arm 68 for additional structural support.

Figure 2C:
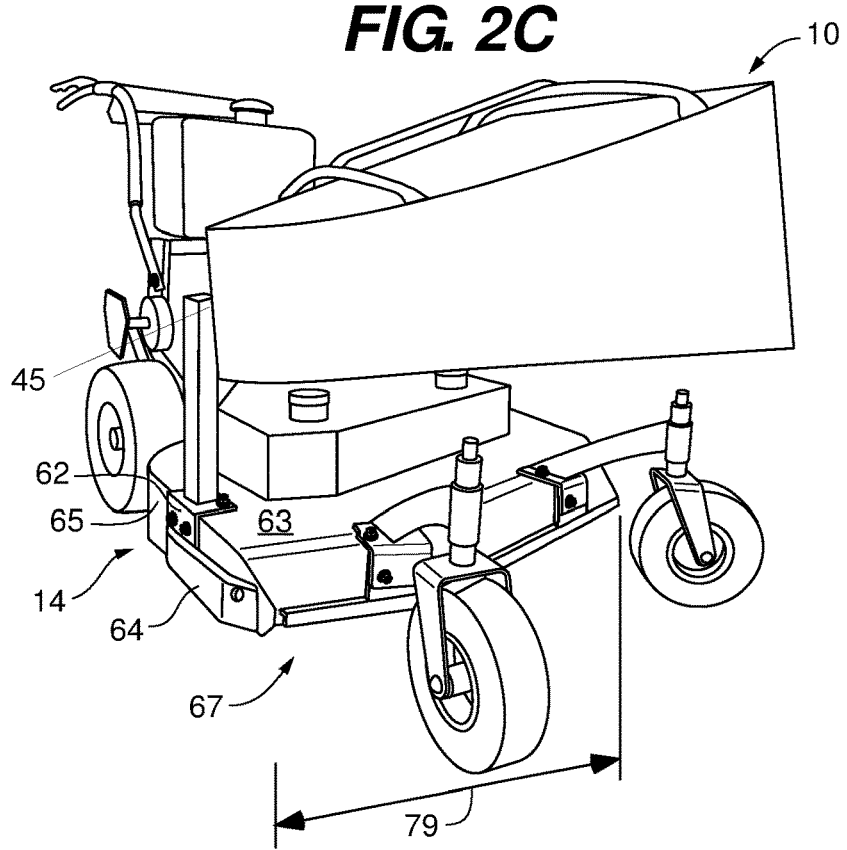
FIG. 2C is a pictorial representation of a front view of a lawn mower with a commercial grass catcher mounted thereto via the device of FIG. 2B.
Figure 2D:
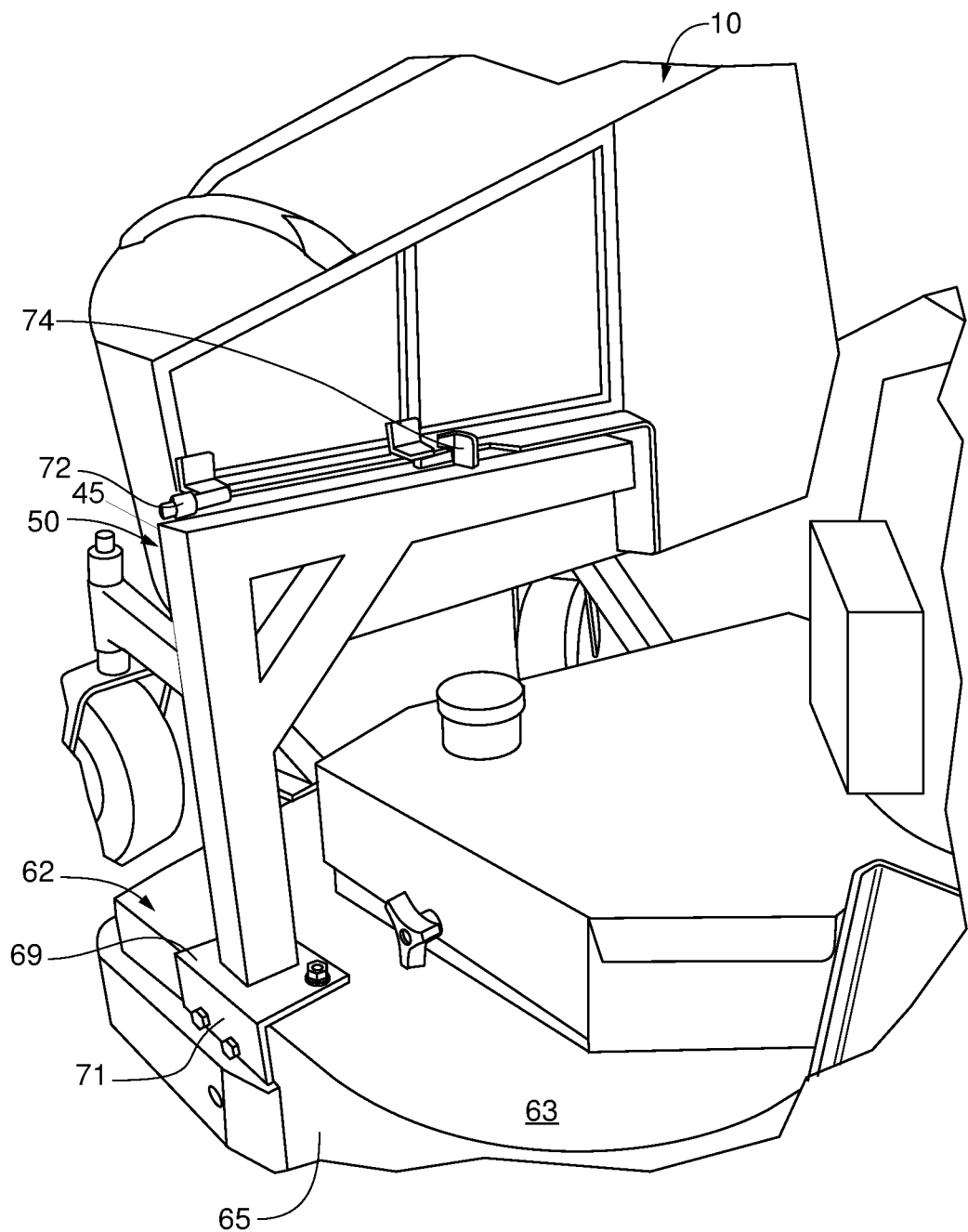
FIG. 2D is a pictorial representation of a rear view of the lawn mower of FIG. 2C with the commercial grass catcher mounted thereto via the device of FIG. 2B.

Referring now to an embodiment of the device 50 shown in FIGS. 2B-2D, for example, for use with the commercial lawn mower 14 shown in FIG. 1A, the device 50 is also configured to retain a grass catcher 10 in a position on the lawn mower that avoids contact with any other portions of the lawn mower, thereby avoiding expensive damage to the lawn mower during transport. Referring to FIGS. 2B-2D, for example, once installed onto the lawn mower 14, the device 50 can remain permanently fixed to the lawn mower 14, providing an additional guard, both with and without the grass catcher mounted thereto, for protecting units of the engine 52 during both normal use and transport of the grass catcher 10.

Referring to FIG. 2B, for example, embodiments of the device 50 of the present disclosure include a mounting unit 60 configured to mount the device 50 to the lawn mower 14, for example, to a cutting deck 58 of the mower 14. In embodiments, as shown, the mounting unit 60 is mounted to the side planar surface 65 and top planar surface 63 of the cutting deck 58. As also shown in FIG. 2C, the mounting unit 60 may be permanently mounted with bolts and nuts, and/or screws. The lawn mower 14 may, in embodiments, be modified with through holes as needed to mount the mounting unit 60 thereto. For stability, the mounting unit 60 may include an angle bracket 62 mounted to planar surfaces, for example, to a top planar surface 63 and a side planar surface 65 of the lawn mower 14, e.g., to the top planar surface 63 and the side planar surface 65 of the cutting deck 58 in the front portion 67 of the lawn mower 14, and may also include an additional plate 64 extending forward, i.e., toward a front edge of the lawn mower 14 and in the direction of the grass catcher 10 mounted thereto.

Referring to FIGS. 2A-2D, the device of the present disclosure also includes a support strut 66 extending upward from the mounting unit 60, preferably from a top plate 69 (see FIGS. 2A, 2D) of the mounting unit 60, which preferably terminates at a horizontal arm 68 integral thereto. The top plate 69 is mounted flat to the top planar surface 63. In the embodiments shown in FIGS. 2B-3 (best shown in FIG. 2D), the top plate 69 forms one leg of the angle bracket 62 that forms at least a portion of the mounting unit 60, and a vertical plate 71 extending perpendicularly down from, and preferably integral with, the top plate 69 forms the other leg of the angle bracket 62. As shown, the vertical plate 71 is mounted onto the side planar surface 65 of the lawn mower 14. The device 50 may also include an angled support strut 70 integrally connecting across the support strut 66 and the horizontal arm 68, preferably at a 45 degree angle, for structural support.

For mounting the grass catcher 10 of FIG. 1A, 1B, for example, to the device 50 for transporting and storing, the device 50 of the present disclosure further includes retaining elements, in particular, first retaining element 72 and second retaining element 74, which are shaped similarly to the first 22 and second 24 attachment elements on the accessory bracket 16 mounted to the lawn mower 14 (see FIGS. 1A, 2B-2D), and spaced by a distance 57 (see FIG. 2A) corresponding to the distance, for example, between the first 22 and second 24 attachment elements. Accordingly, the first retaining element 72 is configured to retain the first mounting element 26 of the grass catcher 10, for example, which is positioned at an outer edge 27 of the grass catcher 10, and the second retaining element 74 is configured to retain the second mounting element 28. The second mounting element 28 is positioned inward from the outer edge 27 of the grass catcher, and either over the intake port 13, like the grass catcher 10 of FIG. 1A, or along the inner edge 29 of the intake port 13 that adjoins the added width 11 of the grass catcher 10, as shown in FIG. 1B. It will be appreciated that in embodiments, the retaining elements described herein on the device 50 can be shaped and spaced in accordance with the first and the second attachment element on any lawn mower adapted for use with a grass catcher.

It will also be appreciated that the position of the first retaining element 72 and the second retaining element 74 along the horizontal arm 68 will be based on which planar surface of the lawn mower the mounting base 60 can be attached to, as dictated by the particular shape of the frame of the lawn mower and the positioning of the engine 52 and other parts. In all embodiments, when the grass catcher is mounted to the device 50 for transport, it does not contact any portion of the lawn mower. Furthermore, each of the first 72 and the second retaining element 74 is positioned along the horizontal arm 68 relative to the mounting base 60 and support strut 66 such that the total width 17 of the face 44 of the grass catcher, which is positioned adjacent to, and in embodiments, rests against, a front side surface 45 of the horizontal arm 68, is located within the width 79 of the lawn mower (see FIG. 2C).

The front side surface 45 of the horizontal arm 68 is understood herein to refer to the side surface that is aligned adjacent to, and which may contact, in embodiments, the facing surface 44 of the grass catcher mounted to the device 50 for transport or storage.

For example, in the embodiment of the device 50 depicted in FIGS. 2B-2D, the mounting unit 60 is mounted onto the side planar surface 65 and top planar surface 63 of the cutting deck 58 such that the support strut 66 is also positioned along the side planar surface 65 and is substantially parallel thereto. The horizontal arm 68 may extend only in one direction from the support strut 66, that is, it extends over the cutting deck 58 and over at least a portion of the width 79 of the lawn mower, no portion of the horizontal arm 68 being positioned exterior to the support strut 66 or beyond the footprint of the lawn mower 14. Referring to FIGS. 2A and 2B, in this mounting configuration, first retaining element 72 is positioned on an adjoining portion 73 of the horizontal arm 68 that connects to the support strut 66 and the second retaining element 74 is positioned at the distance 57 from the first retaining element 72 corresponding to the distance 25 (see FIG. 1B) between the mounting elements of the grass catcher 10. Accordingly, the device 50 is securely mounted to planar surfaces of the lawn mower, and the total width 17 of the grass catcher is positioned within the width 79 of the lawn mower.

Referring to FIGS. 1A, 1C, 2A and 2B, the first retaining element 72 of the device 50 may, in embodiments, be an element that includes an aperture, and may be a nut, eye bolt, or other ring-shaped element, or a plate with an aperture, permanently secured to the horizontal arm 68. The first retaining element 72 is configured for the first mounting element 26 on the grass catcher 10 to be inserted and captured therein as shown in FIG. 2C. The device 50 also includes the second retaining element 74, which includes at least one flat plate against which the second mounting element abuts, and which is preferably a bracket, which may be a right angle bracket formed of perpendicular flat plates or a clip. As best shown in FIG. 2B, for example, a first leg 75 of the right angle bracket forming the second retaining element 74 is a plate that extends from the vertex of the right angle bracket toward the first retaining element 72, and a second leg 77 is in the shape of a plate, positioned vertically to the horizontal arm, and that extends integrally and perpendicularly from the vertex formed with the first leg 75 in a direction away from the front portion 67 of the lawn mower 14 so that a pocket is formed. The first leg 75 thus extends along an edge of the front side surface 45 of the horizontal arm, which faces the facing side 44 of the grass catcher in use when mounted for transport, as shown in FIG. 2C. Referring to FIGS. 2A-2D as well as to FIGS. 1A-1C, the second mounting element 28 on the grass catcher 10, 10' abuts the second leg 77 of the second retaining element 74 and the first leg 75 forming the pocket retains the second mounting element 28, preventing it from falling forward out of the pocket, thus preventing the grass catcher from falling off of the mounting device 50.

As will be appreciated by one of skill in the art, various modifications of the exemplary device 50, to fit various types of lawn mowers and grass catchers, including those referred to herein, may be embodied in the present invention and disclosure without departing from the spirit and scope of the invention.

While the distance 57 between first 72 and second retaining elements 74 will be determined by the distance 25 between first and second mounting elements on a particular grass catcher, other dimensions and features of the device, such as a height 59 (see FIG. 2A) of the support strut 66, will be determined by the particular lawn mower(s) the grass catcher is adapted for. In some embodiments a height 59 the support strut 66 may be adjustable, using a system of apertures and pins, for example, as known in the art. In this way, the height of the grass catcher when mounted via the device can be maintained as low as possible, for stability, but high enough to clear the motor, muffler, cutting deck, and so on of the lawn mower.

In embodiments, the distance 57 separating first 72 and second retaining elements 74 may be between about 8 inches to about 15 inches, while the overall length 61 of the horizontal arm 68 is longer than the distance 57, and may be, in embodiments, between about 9 inches and 18 inches. An axis of the horizontal arm 68 is defined along its length 61 as shown.

In further embodiments, the height 59 of the support strut 66 may be between about 4 inches and about 12 inches high.

Figure 3:
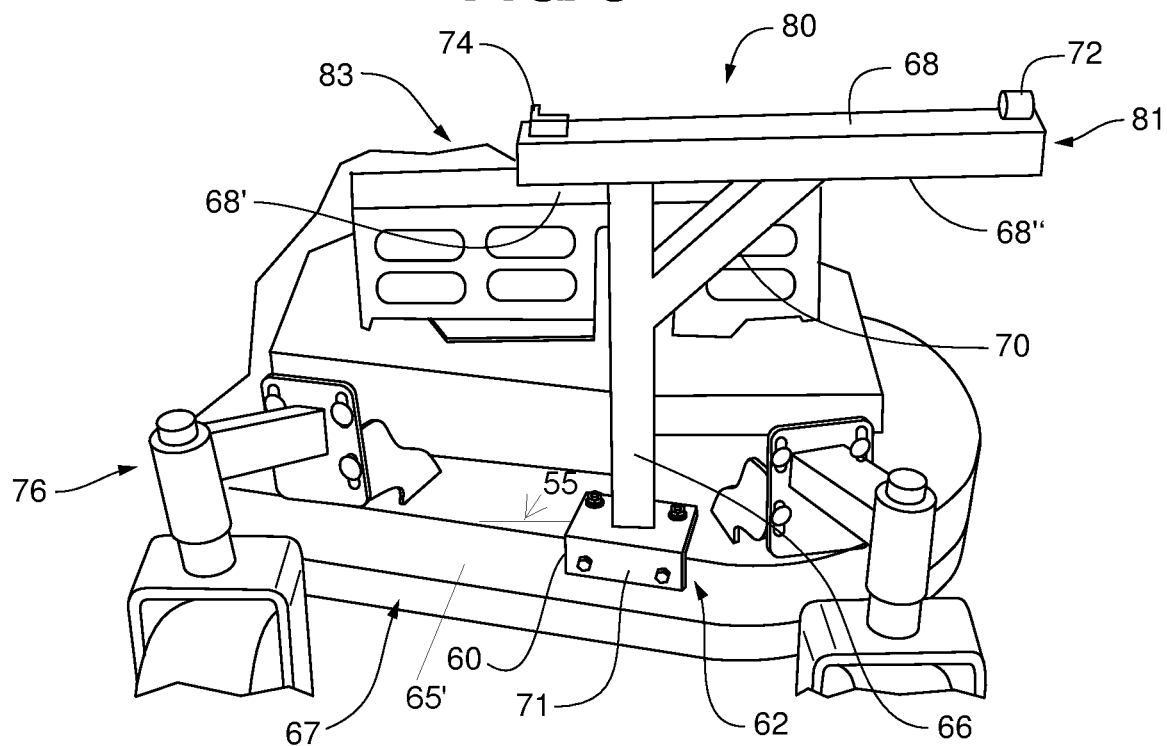
FIGS. 3 and 4 are pictorial representations of additional embodiments of a device of the present disclosure mounted on different commercial lawn mowers.

Referring now to FIG. 3, some commercial lawn mowers 76 do not provide a suitable mounting surface on a side and top of the cutting deck as shown in FIGS. 2A-2D, and instead the mounting unit 60 of embodiments 80 of the device is configured to be mounted onto a front side planar surface 65' and top planar surface 63 of the lawn mower 76 in the front portion 67. As shown in FIG. 3, the front side may be non-perpendicular to a length, or direction of travel, of the lawn mower 76. Accordingly, in embodiments, the vertical plate 71 of the angle bracket 62 forming at least a portion of the mounting unit 60 that mounts flat to the front side of the lawn mower 76 may lie in a plane rotated by an angle 55 to the planar side of the support strut 66 and/or the front side surface 45 of the horizontal arm 68, such that the horizontal arm 68 is aligned with the width 79 of the lawn mower. Accordingly, the face 44 of the grass catcher 10 is also positioned parallel to the width 79 of the lawn mower (see FIGS. 1A, 2C, e.g.) in use to assure that the grass catcher 10 does not extend beyond the width of the lawn mower and also to better distribute the weight of the grass catcher 10 during transport on the lawn mower.

The angle 55, in embodiments, may be between about 10 and 20 degrees.

Figure 4:
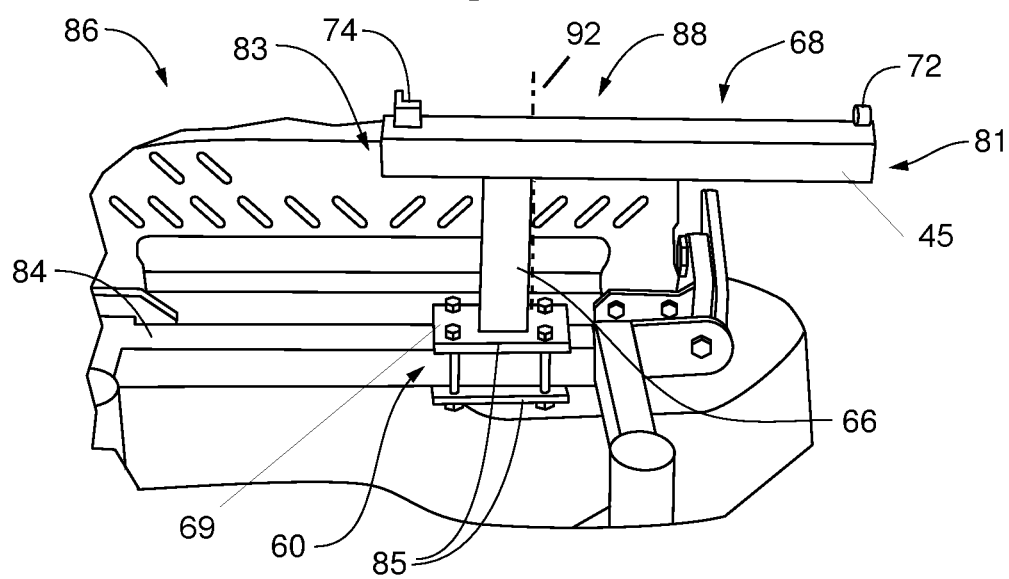

As shown in FIG. 3, as well as FIG. 4, in embodiments in which the mounting unit 60 is configured to mount to the front side planar surface 65', the mounting unit 60 and support strut 66 extending upward therefrom are positioned inward from a side edge of the lawn mower. Accordingly, the horizontal arm 68, which includes first 72 and second retaining elements 74, extends from both sides of the support strut 66 as needed to maintain the footprint, or the face 44, of a grass catcher stored on the lawn mower 76, via embodiments 86 or 88 of the device, for example, within the width 79 of the lawn mower 76, and to avoid contact of the grass catcher with the lawn mower 76. In these embodiments, the horizontal arm 68 may include a first portion 68' extending in one direction and a second portion 68" extending in an opposite direction from the support strut 66, wherein the first portion 68' is shorter than the second portion 68".

In embodiments, the second portion 68" is about two to three times as long as the first portion 68'. In further embodiments, the first portion 68' is between about 3" and 4" long, and the second portion 68" is between about 12" and 13" long.

With the device 80 mounted to the lawn mower 76, the first retaining element 72, which is configured for mounting the first mounting element 26 adjacent the outer edge 27 of the grass catcher 10, 10', for example, thereto, is positioned adjacent an end portion 81 of the horizontal arm 68 that is positioned along a side of the lawn mower 76, so that a grass catcher mounted thereto will be positioned within the width 79 of the lawn mower 76.

In further embodiments, the device 80 may include the angled support strut 70 connected at an approximate 45-degree angle between the support strut 66 and the second portion 68" of the horizontal arm 68 for additional structural support.

In additional embodiments, as shown in FIGS. 3 and 4, with the mounting unit 60 mounted along a front side of the lawn mower 76, the first retaining element 72 is positioned at an end portion 81 of the second portion 68" of the horizontal arm 68, and the second retaining element 74 is positioned along an end portion 83 of the first portion 68' of the horizontal arm 68 for attaching the first mounting element 26 and the second mounting element 28, respectively, of grass catcher 10, for example, thereto. The grass catcher 10 is attached to the front of the device 80 of FIG. 3 or device 88 of FIG. 4 for transport, the total width 17 of the face 44 of the grass catcher 10 (see FIG. 2A, e.g.) thus being maintained within the width 79 (see FIG. 2C) of the lawn mower for transport.

Referring to FIG. 4, in other embodiments 88 of the device of the present disclosure, for mounting to particular types of lawn mower frames, such as the lawn mower 86 shown, the mounting unit 60 may be in the form of parallel plates 85, including the top plate 69 from which the support strut 66 extends, mounted via bolts and nuts on either side of a bar 84 provided on the front of the lawn mower 86.

Figure 5:
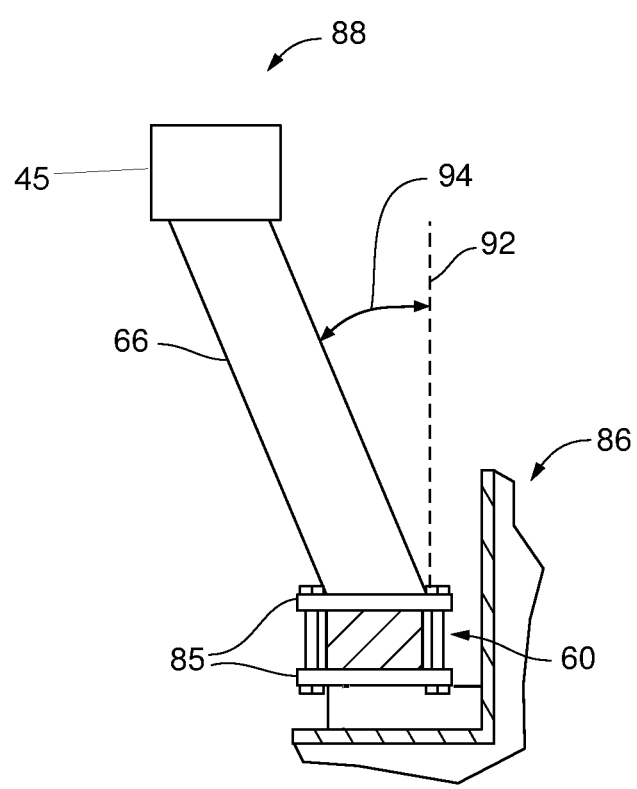
FIG. 5 is a pictorial representation of a side view of the device of FIG. 4.

In further embodiments, referring to FIGS. 4 and 5, the support strut 66 may be oriented at an angle 94 relative to a vertical, or perpendicular, axis 92 to the mounting unit 60, the support strut 66 being angled toward the grass catcher mounted thereto, i.e., toward the front side surface 45 of the horizontal arm 68, and toward a front, and away from the engine 52 and other portions, of the lawn mower 86, to avoid the grass catcher contacting parts of this particular lawn mower 86. In embodiments, angle 94 may be between about 10 and 20 degrees, and in further embodiments, angle 94 is about 15 degrees.

The device of the present disclosure for storing and transporting a grass catcher on a lawn mower may be made, in embodiments, from steel. In embodiments, each of the horizontal arm 68 and support strut 66 and, in embodiments, the angled support 70, may be formed of hollow rods, with rectangular cross-sections. In further embodiments, the hollow rods or tubes are formed of about $1/8^{th}$ inch thick steel walls, with an outer diameter of about 1¾ inch.

While the invention has been particularly shown and described with reference to specific embodiments, it should be apparent to those skilled in the art that the foregoing is illustrative only and not limiting, having been presented by way of example only. It is to be understood that the disclosed embodiments are merely examples of the invention, which may be embodied in various forms and detail without departing from the spirit and scope of the disclosure. Therefore, specific structural and functional details disclosed herein are not to be interpreted as limiting. Numerous other embodiments may fall within the scope of the accompanying claims and equivalents thereto.

What is claimed is:

1. A device for transporting a grass catcher on a commercial lawn mower, the grass catcher having a first mounting element positioned along its outer edge and a second mounting element positioned apart therefrom for aligning and mounting the grass catcher onto a side discharge port of the commercial lawn mower in use, the device comprising:
a mounting unit including a top plate for mounting to a top planar surface on the front portion of the commercial lawn mower;
a support strut extending upward from the mounting unit; and
a horizontal arm extending perpendicularly from a top end of the support strut, the horizontal arm including a first retaining element and a second retaining element separated a distance therefrom, the first retaining element configured for retaining the first mounting element of the grass catcher and the second retaining element configured for retaining the second mounting element of the grass catcher for transport.

2. The device of claim 1, wherein the first retaining element is one of a nut, eye bolt, and ring-shaped element including an aperture, wherein the aperture is aligned perpendicular to the horizontal arm and facing the second retaining element, and wherein the first retaining element is configured for retaining the first mounting element of the grass catcher within the aperture.

3. The device of claim 2, wherein the second retaining element includes two plates extending integrally upward from the horizontal arm, a first one of the two plates extending away from a second one of the two plates in a direction along the horizontal arm toward the first retaining element, the second one of the two plates extending perpendicularly from the first one, being positioned parallel to and facing the aperture of the first retaining element.

4. The device of claim 3, wherein the first one of the two plates extends along an edge of a front side surface of the horizontal arm, the front side surface configured to face the grass catcher mounted thereto for transport.

5. The device of claim 4, wherein the horizontal arm of the device in use on the lawn mower is oriented with respect to the mounting unit to align the horizontal arm with a width of the lawn mower.

6. The device of claim 5, wherein the first retaining element and the second retaining element are positioned along the horizontal arm such that a width of the grass catcher mounted against the front side surface in use does not extend beyond the width of the lawn mower.

7. The device of claim 1, further including an angled support strut connected at a 45 degree angle to each of the support strut and the horizontal arm.

8. The device of claim 1, wherein the distance between the first retaining element and the second element is between about 9 inches and about 18 inches, and wherein a height of the support strut from the top plate of the mounting unit is between about 4 inches and about 12 inches high.

9. The device of claim 1, wherein the support strut is positioned at an angle of between about 10 to about 20 degrees relative to a perpendicular axis to the top plate of the mounting unit, the support strut being angled in a direction toward a front side surface of the horizontal arm.

10. The device of claim 1, wherein the mounting unit includes a pair of parallel plates including the top plate, and bolts extending through the pair of parallel plates, for mounting to a bar in the front portion of the lawn mower.

11. The device of claim 1, wherein the mounting unit includes a right angle bracket, the right angle bracket including the top plate for mounting to the top planar surface and a vertical plate extending integrally therefrom for mounting to a side planar surface of the lawn mower.

12. The device of claim 11, wherein the vertical plate is aligned at an angle of between about 10 and about 20 degrees to the front side surface of the horizontal arm.

13. The device of claim 1, wherein the horizontal arm includes a first portion extending in one direction and a second portion extending in an opposite direction from the support strut.

14. The device of claim 13, wherein the second portion is between two to three times longer that the first portion of the horizontal arm, the device further including an angled support strut connected at a 45 degree angle to each of the support strut and the second portion of the horizontal arm.

15. In combination:
a grass catcher having a facing side for mounting to, and extending beyond, a side discharge port of a commercial lawn mower in use, a first mounting element positioned along its outer edge and a second mounting element positioned apart therefrom for aligning and mounting the grass catcher onto the side discharge port of the commercial lawn mower in use; and
a device for transporting and storing the grass catcher when not in use, the device comprising:
a mounting unit including a top plate for mounting to a top planar surface on the front portion of the commercial lawn mower;
a support strut extending upward from the mounting unit; and
a horizontal arm extending perpendicularly from a top end of the support strut, the horizontal arm including a first retaining element and a second retaining element separated a distance therefrom, the first retaining element configured for retaining the first mounting element of the grass catcher and the second retaining element configured for retaining the second mounting element of the grass catcher for transport and storage of the grass catcher.

16. The combination of claim 15, wherein the first retaining element is one of a nut, eye bolt, and ring-shaped element including an aperture, wherein the aperture is aligned perpendicular to the horizontal arm and facing the second retaining element, and wherein the first retaining element is configured for retaining the first mounting element of the grass catcher within the aperture and the second retaining element is configured for retaining the second mounting element of the grass catcher mounted thereto for transport.

17. The combination of claim 16, wherein the second retaining element includes two plates extending integrally upward from the horizontal arm, a first one of the two plates extending away from a second one of the two plates in a direction along the horizontal arm toward the first retaining element, the second one of the two plates extending perpendicularly from the first one, being positioned parallel to and facing the aperture of the first retaining element.

18. The combination of claim 17, wherein the first one of the two plates extends along an edge of a front side surface of the horizontal arm, the front side surface facing the grass catcher mounted thereto for transport.

19. The combination of claim 15, wherein the horizontal arm of the device is oriented with respect to the mounting unit to align the horizontal arm with a width of the lawn mower and the first retaining element and the second retaining element are positioned along the horizontal arm such that a width of the grass catcher mounted against a front side surface of the horizontal arm does not extend beyond the width of the lawn mower.

20. The combination of claim 15, wherein the distance between the first retaining element and the second element is between about 9 inches and about 18 inches, and wherein a height of the support strut from the top plate of the mounting unit is between about 4 inches and about 12 inches high.

* * * * *